US011915424B2

(12) United States Patent
Shamir et al.

(10) Patent No.: US 11,915,424 B2
(45) Date of Patent: Feb. 27, 2024

(54) EVALUATING QUALITY OF SEGMENTATION OF AN IMAGE INTO DIFFERENT TYPES OF TISSUE FOR PLANNING TREATMENT USING TUMOR TREATING FIELDS (TTFIELDS)

(71) Applicant: Novocure GmbH, Root (CH)

(72) Inventors: Reuven R. Shamir, Haifa (IL); Zeev Bomzon, Kiryat Tivon (IL); Mor Vardi, Haifa (IL)

(73) Assignee: Novocure GmbH, Root (CH)

( * ) Notice: Subject to any disclaimer, the term of this patent is extended or adjusted under 35 U.S.C. 154(b) by 0 days.

(21) Appl. No.: 17/667,844

(22) Filed: Feb. 9, 2022

(65) Prior Publication Data

US 2022/0254025 A1 Aug. 11, 2022

Related U.S. Application Data

(62) Division of application No. 16/736,604, filed on Jan. 7, 2020, now Pat. No. 11,276,171.

(Continued)

(51) Int. Cl.
*G06K 9/00* (2022.01)
*G06T 7/00* (2017.01)
(Continued)

(52) U.S. Cl.
CPC .............. *G06T 7/0014* (2013.01); *G06T 7/10* (2017.01); *G06T 17/00* (2013.01);
(Continued)

(58) Field of Classification Search
CPC ......... G06T 7/001; G06T 7/248; G06T 7/337; G06T 7/30–37; G06T 7/10–194;
(Continued)

(56) References Cited

U.S. PATENT DOCUMENTS 6,868,289 B2 3/2005 Palti
7,016,725 B2 3/2006 Palti
(Continued)

FOREIGN PATENT DOCUMENTS

WO WO-2016059385 A1 * 4/2016 ............... G06T 7/11
WO 2017072706 A1 5/2017

OTHER PUBLICATIONS

Akhondi-Asl et al., "Simultaneous Truth and Performance Level Estimation Through Fusion of Probabilistic Segmentations," IEEE Trans. Med. Imaging, vol. 32, No. 10, pp. 1840-1852, Oct. 2013.
(Continued)

*Primary Examiner* — Atiba O Fitzpatrick
(74) *Attorney, Agent, or Firm* — Potomac Law Group, PLLC

(57) ABSTRACT

To plan tumor treating fields (TTFields) therapy, a model of a patient's head is often used to determine where to position the transducer arrays during treatment, and the accuracy of this model depends in large part on an accurate segmentation of MRI images. The quality of a segmentation can be improved by presenting the segmentation to a previously-trained machine learning system. The machine learning system generates a quality score for the segmentation. Revisions to the segmentation are accepted, and the machine learning system scores the revised segmentation. The quality scores are used to determine which segmentation provides better results, optionally by running simulations for models that correspond to each segmentation for a plurality of different transducer array layouts.

16 Claims, 6 Drawing Sheets

Related U.S. Application Data

(60) Provisional application No. 62/789,660, filed on Jan. 8, 2019.

(51) Int. Cl.
  *G06T 7/10* (2017.01)
  *G06T 17/00* (2006.01)

(52) U.S. Cl.
  CPC ........... *G06T 2207/10088* (2013.01); *G06T 2207/20081* (2013.01); *G06T 2207/30016* (2013.01); *G06T 2207/30096* (2013.01)

(58) Field of Classification Search
  CPC ............... G06T 2207/20021; G06T 2207/20112–20168; G06T 2207/30168; G06T 7/0002; G06T 5/00–009; G06T 2207/20172; G06T 2207/20128; G06T 7/0012–0016; G06T 2207/10064–10136; G06T 2207/30004–30104; G06V 10/751; G06V 10/752; G06V 10/753; G06V 10/7515; G06V 10/757; G06V 10/759; G06V 10/761; G06V 10/25–273; G06V 20/49; G06V 20/695; G06V 40/162; G06V 20/80; G06V 20/698; G06V 10/993; G06V 10/987; G06V 10/776; G06V 2201/03–034; A61B 5/7485; G06K 9/6224
  See application file for complete search history.

(56) References Cited

U.S. PATENT DOCUMENTS

| | | |
|---|---|---|
| 7,089,054 B2 | 8/2006 | Palti |
| 7,136,699 B2 | 11/2006 | Palti |
| 7,333,852 B2 | 2/2008 | Palti |
| 7,467,011 B2 | 12/2008 | Palti |
| 7,519,420 B2 | 4/2009 | Palti |
| 7,565,205 B2 | 7/2009 | Palti |
| 7,565,206 B2 | 7/2009 | Palti |
| 7,599,745 B2 | 10/2009 | Palti |
| 7,599,746 B2 | 10/2009 | Palti |
| 7,706,890 B2 | 4/2010 | Palti |
| 7,715,921 B2 | 5/2010 | Palti |
| 7,805,201 B2 | 9/2010 | Palti |
| 7,890,183 B2 | 2/2011 | Palti et al. |
| 7,912,540 B2 | 3/2011 | Palti |
| 7,917,227 B2 | 3/2011 | Palti |
| 8,019,414 B2 | 9/2011 | Palti |
| 8,027,738 B2 | 9/2011 | Palti |
| 8,170,684 B2 | 5/2012 | Palti |
| 8,175,698 B2 | 5/2012 | Palti et al. |
| 8,229,555 B2 | 7/2012 | Palti |
| RE43,618 E | 8/2012 | Palti |
| 8,244,345 B2 | 8/2012 | Palti |
| 8,406,870 B2 | 3/2013 | Palti |
| 8,447,395 B2 | 5/2013 | Palti et al. |
| 8,447,396 B2 | 5/2013 | Palti et al. |
| 8,465,533 B2 | 6/2013 | Palti |
| 8,706,261 B2 | 4/2014 | Palti |
| 8,715,203 B2 | 5/2014 | Palti |
| 8,718,758 B2 | 5/2014 | Palti |
| 8,764,675 B2 | 7/2014 | Palti |
| 9,023,090 B2 | 5/2015 | Palti |
| 9,023,091 B2 | 5/2015 | Palti |
| 9,039,674 B2 | 5/2015 | Palti et al. |
| 9,056,203 B2 | 6/2015 | Palti et al. |
| 9,440,068 B2 | 9/2016 | Palti et al. |
| 9,655,669 B2 | 5/2017 | Palti et al. |
| 9,750,934 B2 | 9/2017 | Palti et al. |
| 9,910,453 B2 | 3/2018 | Wasserman et al. |
| 10,188,851 B2 | 1/2019 | Wenger et al. |
| 10,441,776 B2 | 10/2019 | Kirson et al. |
| 10,967,167 B2 | 4/2021 | Hagemann et al. |
| 11,103,698 B2 | 8/2021 | Chang et al. |
| 11,191,956 B2 | 12/2021 | Giladi et al. |
| 11,224,741 B2 | 1/2022 | Kirson et al. |
| 2006/0167499 A1 | 7/2006 | Palti |
| 2007/0225766 A1 | 9/2007 | Palti |
| 2007/0239213 A1 | 10/2007 | Palti |
| 2008/0108894 A1* | 5/2008 | Elgavish ............... G06T 19/00 600/407 |
| 2008/0317308 A1* | 12/2008 | Wu .................... G06T 7/0012 382/128 |
| 2009/0076366 A1 | 3/2009 | Palti |
| 2011/0092762 A1* | 4/2011 | Wong .................. A61B 17/435 435/6.1 |
| 2012/0027272 A1 | 2/2012 | Akinyemi et al. |
| 2012/0283726 A1 | 11/2012 | Palti |
| 2016/0098842 A1 | 4/2016 | Frosio et al. |
| 2017/0120041 A1 | 5/2017 | Wenger et al. |
| 2017/0213067 A1 | 7/2017 | Padmanabhan et al. |
| 2017/0215939 A1 | 8/2017 | Palti et al. |
| 2017/0281934 A1 | 10/2017 | Giladi et al. |
| 2017/0337711 A1 | 11/2017 | Ratner et al. |
| 2018/0001075 A1 | 1/2018 | Kirson et al. |
| 2018/0008708 A1 | 1/2018 | Giladi et al. |
| 2018/0050200 A1 | 2/2018 | Wasserman et al. |
| 2018/0160933 A1 | 6/2018 | Urman et al. |
| 2018/0202991 A1 | 7/2018 | Giladi et al. |
| 2018/0295375 A1 | 10/2018 | Ratner |
| 2019/0117956 A1 | 4/2019 | Wenger et al. |
| 2019/0117963 A1 | 4/2019 | Travers et al. |
| 2019/0183344 A1* | 6/2019 | Gallippi .................. A61B 8/08 |
| 2019/0307781 A1 | 10/2019 | Krex et al. |
| 2019/0308016 A1 | 10/2019 | Wenger et al. |
| 2019/0325578 A1 | 10/2019 | Mohammad et al. |
| 2019/0350538 A1* | 11/2019 | Wilson ................... G06T 5/001 |
| 2020/0001069 A1 | 1/2020 | Kirson et al. |
| 2020/0009376 A1 | 1/2020 | Chang et al. |
| 2020/0009377 A1 | 1/2020 | Chang et al. |
| 2020/0016067 A1 | 1/2020 | Gotlib et al. |
| 2020/0023179 A1 | 1/2020 | Bomzon et al. |
| 2020/0027561 A1* | 1/2020 | Rao ...................... A61B 5/055 |
| 2020/0061360 A1 | 2/2020 | Hagemann et al. |
| 2020/0061361 A1 | 2/2020 | Hagemann et al. |
| 2020/0069937 A1 | 3/2020 | Naveh et al. |
| 2020/0078582 A1 | 3/2020 | Alon et al. |
| 2020/0108031 A1 | 4/2020 | Borst et al. |
| 2020/0121728 A1 | 4/2020 | Wardak et al. |
| 2020/0126207 A1 | 4/2020 | Saltz et al. |
| 2020/0129761 A1 | 4/2020 | Bomzon et al. |
| 2020/0269041 A1 | 8/2020 | Zeevi et al. |
| 2020/0269042 A1 | 8/2020 | Giladi et al. |
| 2020/0269043 A1 | 8/2020 | Wasserman et al. |
| 2020/0306531 A1 | 10/2020 | Tran et al. |
| 2020/0327674 A1 | 10/2020 | Yang et al. |
| 2020/0330755 A1 | 10/2020 | Wasserman et al. |
| 2020/0368525 A1 | 11/2020 | Maag et al. |
| 2021/0000528 A1 | 1/2021 | Palti et al. |
| 2021/0031031 A1 | 2/2021 | Wasserman et al. |
| 2021/0038584 A1 | 2/2021 | Voloshin-Sela |
| 2021/0060334 A1 | 3/2021 | Avraham et al. |
| 2021/0069503 A1 | 3/2021 | Tran et al. |
| 2021/0187277 A1 | 6/2021 | Wasserman et al. |
| 2021/0196348 A1 | 7/2021 | Wasserman |
| 2021/0199640 A1 | 7/2021 | Patel et al. |
| 2021/0203250 A1 | 7/2021 | Wasserman |
| 2021/0268247 A1 | 9/2021 | Story et al. |
| 2021/0299440 A1 | 9/2021 | Deslauriers et al. |
| 2021/0308446 A1 | 10/2021 | Alon et al. |
| 2021/0330950 A1 | 10/2021 | Hagemann et al. |
| 2021/0346694 A1 | 11/2021 | Wasserman et al. |
| 2021/0379362 A1 | 12/2021 | Smith et al. |
| 2021/0408383 A1 | 12/2021 | Kalra et al. |

OTHER PUBLICATIONS

Bomzon et al., "Using computational phantoms to improve the delivery of Tumor Treating Fields (TTFields) to patients," 38th

(56) References Cited

OTHER PUBLICATIONS

Annual International Conference of the IEEE Engineering in Medicine and Biology Society (EMBC), IEEE. pp. 6461-6464, 2016.
Commowick et al., "Estimating a Reference Standard Segmentation With Spatially Varying Performance Parameters: Local Map Staple," IEEE Trans. Med. Imaging, vol. 31, No. 8, pp. 1593-1606, May 2012.
Devries et al., "Leveraging Uncertainty Estimates for Predicting Segmentation Quality," arxiv.org, Cornell University, Jul. 2018.
Fernandes et al., "Deep Image Segmentation by Quality Inference," 2018 International Joint Conference on Neural Networks (IJCNN), IEEE, pp. 108, Jul. 2018.
Gerig et al., "Valmet: A New Validation Tool for Assessing and Improving 3D Object Segmentation," Proceedings of the 4th International Conference on Medical Imaging Computing and Computer-Assisted Intervention, Lecture Notes in Computer Science 2208, Aug. 2001.
Huang et al., "Fully Automated Whole-Head Segmentation with Improved Smoothness and Continuity, with Theory Reviewed," PlosOne, vol. 10, No. 5, e0125477, May 2015.
International Search Report and Written Opinion issued in application PCT/IB2020/050096 dated May 20, 2020.
Kohlberger et al., "Evaluating Segmentation Error without Ground Truth," International Conference on Financial Cryptography and Data Security, pp. 528-536, Oct. 2012.
Partial International Search Report and Written Opinion issued in application PCT/IB2020/050096 dated Mar. 18, 2020.
Rivest-Henault et al., "Robust Inverse-Consistent Affine CT-MR Registration in MRI-assisted and MRI-alone Prostate Radiation Therapy," Med. Image Anal., vol. 1, pp. 56-69, Jul. 2015.
Robinson et al., "Real-time Prediction of Segmentation Quality," arxiv.org, Cornell University Library, Jun. 2018.
Rottmann et al., "Prediction Error Meta Classification in Semantic Segmentation: Detection via Aggregated Dispersion Measures of Softmax Probabilities," arxiv.org, Cornell University Library, Nov. 2018.
Stupp et al., "Effect of Tumor-Treating Fields Plus Maintenance Temozolomide vs. Maintenance Temozolomide Alone on Survival in Patients with Glioblastoma: A Randomized Clinical Trial," JAMA, vol. 318, pp. 2306-2316, 2017.
Valindria et al., "Reverse Classification Accuracy: Predicting Segmentation Performance in the Absence of Ground Truth," arxiv.org, Cornell University, Feb. 2017.
Warfield et al., "Simultaneous Truth and Performance Level Estimation (Staple): An Algorithm for the Validation of Image Segmentation," IEEE Transactions, vol. 23, No. 7, pp. 903-921, Jul. 2004.
Zhang et al., "Meta-Evaluation of Image Segmentation Using Machine Learning," Conference on Computer Vision and Pattern Recognition, IEEE Computer Society, vol. 1, pp. 1138-1145, Jun. 2006.

* cited by examiner

EVALUATING QUALITY OF SEGMENTATION OF AN IMAGE INTO DIFFERENT TYPES OF TISSUE FOR PLANNING TREATMENT USING TUMOR TREATING FIELDS (TTFIELDS)

CROSS REFERENCE TO RELATED APPLICATIONS

This application is a divisional of U.S. application Ser. No. 16/736,604, filed Jan. 7, 2020, which claims the benefit of U.S. Provisional Application 62/789,660, filed Jan. 8, 2019, each of which is incorporated herein by reference in its entirety.

BACKGROUND

Tumor treating fields (TTFields) is an FDA approved therapy for the management of Glioblastoma Multiform (GBM) and under study for multiple additional indications. See, e.g., Stupp, R., et al.: Effect of Tumor-Treating Fields Plus Maintenance Temozolomide vs Maintenance Temozolomide Alone on Survival in Patients With Glioblastoma: A Randomized Clinical Trial. JAMA. 318, 2306-2316 (2017), which is incorporated herein by reference. TTFields are delivered to the tumor through the placement of transducer arrays (TAs) placed on the patient's scalp and delivery of an electric field to the tumor area. Larger electric field intensities or power densities within the tumor are associated with improved treatment outcomes. Both of these parameters directly depend on the location of the TAs.

One approach for determining where to place the TAs on a particular patient's head is to create an accurate model of the patient's head that includes a tissue-type (e.g., white matter, grey matter, CSF, etc.) for each voxel in the image; position simulated TAs on the model; apply simulated voltages to the TAs; and compute the electric field or power density at each tumor voxel in the model. But heretofore, the step of creating the accurate model of the patient's head that includes the tissue type for each voxel has been an extremely labor-intensive process.

Automated and semi-automated approaches for creating models of a patient's head exist, and these approaches are less labor-intensive. But the accuracy/quality of the models generated using these approaches can vary dramatically from image to image. And when a model with poor accuracy/quality is used to compute the electric field or power density at each tumor voxel in the model, the calculated electric field or power density can diverge significantly with respect to the actual electric field or power density. And this divergence can have clinical implications because when the actual electric field or power density is significantly lower than predicted, the patient may not receive the full benefit of his or her TTFields treatment.

SUMMARY OF THE INVENTION

One aspect of the invention is directed to a first method of estimating a quality of a segmentation of an image. The first method comprises training a machine learning system to estimate quality of a segmentation of an image based on a plurality of reference images and at least one quality score that has been assigned to each of the reference images. The first method also comprises presenting a new image and a segmentation of the new image to the machine learning system; receiving, from the machine learning system, at least one first quality score for the segmentation of the new image; and outputting the at least one first quality score for the segmentation of the new image.

In some instances of the first method, the machine learning system is trained to estimate the quality of segmentation of an image based on (a) a quality of affine registration, (b) a quality of deformable registration, (c) input image properties, and (d) geometrical properties of segmented tissues.

In some instances of the first method, the quality of deformable registration is determined based on a deformation's field bias, directional variability, and mean per-axis variability. In some instances of the first method, the input image properties comprise a shortest axis length and a signal to noise ratio of each tissue separately. In some instances of the first method, the geometrical properties of the segmented tissues comprise a volume of a shape and a number of connected components, each of which is computed per tissue.

In some instances of the first method, the machine learning system is trained to estimate the quality of segmentation of the new image based on at least one global quality feature, at least one local quality feature, and a shortest axis length for intra-cranial tissues. In these instances, the machine learning system is trained to estimate the quality of segmentation of the new image based on image quality and tissue's shape properties for extra-cranial tissues.

Some instances of the first method further comprise making an automatic adjustment to the segmentation; presenting the adjusted segmentation to the machine learning system; receiving, from the machine learning system, at least one second quality score for the adjusted segmentation; and outputting an indication when the at least one second quality score indicates an improved quality with respect to the at least one first quality score.

Another aspect of the invention is directed to a second method of improving quality of a segmentation of an image. The second method comprises presenting a new image and a first segmentation of the new image to a machine learning system. The machine learning system has been trained to estimate quality of a segmentation of an image based on a plurality of reference images and at least one quality score that has been assigned to each of the reference images. The second method also comprises receiving, from the machine learning system, at least one first quality score for the first segmentation of the new image; outputting the at least one first quality score for the first segmentation of the new image; and accepting, from a user, at least one revision to the first segmentation. The second method also comprises presenting, to the machine learning system, a second segmentation of the new image, where the second segmentation is based on the at least one revision to the first segmentation; receiving, from the machine learning system, at least one second quality score for the second segmentation of the new image; and outputting the at least one second quality score for the second segmentation of the new image.

In some instances of the second method, the at least one first quality score for the first segmentation of the new image consists of a single first quality score for an entirety of the new image, and the at least one second quality score for the second segmentation of the new image consists of a single second quality score for an entirety of the new image.

In some instances of the second method, the at least one first quality score for the first segmentation of the new image comprises a separate first quality score for each of a plurality of regions within the new image, and the at least one second quality score for the second segmentation of the new image comprises a separate second quality score for each of a plurality of regions within the new image.

In some instances of the second method, the at least one first quality score for the first segmentation of the new image comprises a separate first quality score for each of a plurality of tissue types within the new image, and the at least one second quality score for the second segmentation of the new image comprises a separate second quality score for each of a plurality of tissue types within the new image.

In some instances of the second method, the at least one revision to the first segmentation comprise an adjustment that shifts a calculated probability that a given voxel belongs to a particular tissue type.

In some instances of the second method, the at least one revision to the first segmentation comprise an adjustment that, for all voxels in the new image that correspond to tissue, (a) increases a calculated probability that a given voxel belongs to a first tissue type and (b) decreases a calculated probability that a given voxel belongs to a second tissue type.

Some instances of the second method further comprise (a) calculating how a determined quality of the first segmentation can change an average expected power density in a target region of the new image that corresponds to a tumor by running a finite element simulation using tissue types selected based on the first segmentation, and (b) calculating how a determined quality of the second segmentation can change an average expected power density in the target region of the new image by running a finite element simulation using tissue types selected based on the second segmentation.

Some instances of the second method further comprise (a) calculating how a determined quality of the first segmentation can change a lowest reasonably expected power density in a target region of the new image that corresponds to a tumor by running a finite element simulation using tissue types selected based on the first segmentation, and (b) calculating how a determined quality of the second segmentation can change a lowest reasonably expected power density in the target region of the new image by running a finite element simulation using tissue types selected based on the second segmentation.

Some instances of the second method further comprise maximizing the lowest reasonably expected power density in the tumor bed. Some instances of the second method further comprise computing a confidence score for at least one candidate layout, wherein the confidence score is indicative of odds that a given layout is the best layout.

Another aspect of the invention is directed to a third method of determining a quality of a segmentation. The third method comprises measuring the Dice coefficient between a computed head segmentation and a validated head segmentation of a training set; extracting features to account for a deformable registration quality; incorporating a shortest axis length and a signal to noise ratio of each tissue separately as input image quality; and comparing the measured Dice coefficients between the sets to the Dice coefficients' predictions.

In some instances of the third method, the features extracted to account for the deformable registration quality comprise: deformation's field bias, directional variability, and mean per-axis variability.

In some instances of the third method, a volume of a shape and a number of connected components are used to describe a segmentation shape.

BRIEF DESCRIPTION OF THE DRAWINGS

Various embodiments are described in detail below with reference to the accompanying drawings, wherein like reference numerals represent like elements.

DESCRIPTION OF THE PREFERRED EMBODIMENTS

A key step to improving the placement of TAs in order to obtain the desired field strength (or power density) in the tumor is to correctly segment the head into tissues of similar electrical properties. The conventional approach of visual inspection of segmentation quality is invaluable but time-consuming.

This application describes approaches for estimating the quality or accuracy of a model after the model has been generated. The model may be generated using a manual, automatic, or semi-automatic approach, or a combination of two or more of those approaches. Obtaining an estimate of the quality of a given model can be useful in a number of situations. In one example, when a particular model is tested and it turns out that the estimated quality of that model is low, this outcome lets the user know that steps should be taken to improve the quality of the model before proceeding to the TA placement/simulation stage. On the other hand, when a particular model is tested and it turns out that the estimated quality of that model is high, knowledge of this outcome can provide the operator with an indication that they have spent enough time refining the segmentation, and can proceed to the TA placement simulation stage.

Automatic quality assessment can assist in automatic refinement of the segmentation parameters, suggest flaw points to the user, and indicate if the segmented method is of sufficient accuracy for TTFields simulation.

Figure 1A:
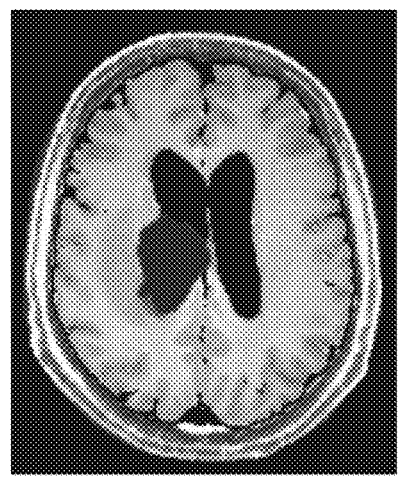
FIG. 1A depicts an MRI T1w image of a GBM patient's head.
Figure 1B:
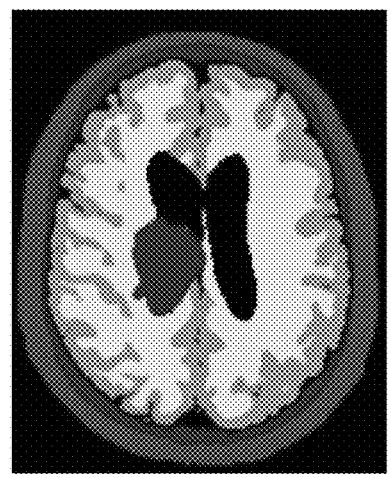
FIG. 1B depicts the segmentation of the FIG. 1A MRI using a reference algorithm.
Figure 1C:
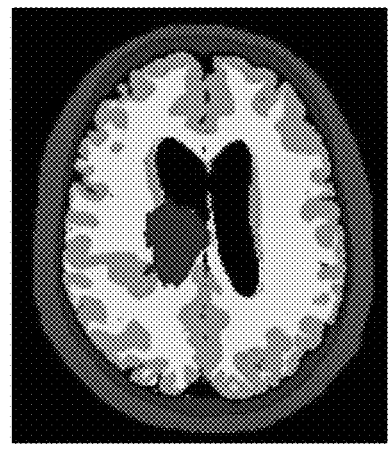
FIG. 1C depicts a validated segmentation that corresponds to the FIG. 1A MRI.

FIG. 1A depicts an MRI T1w image of a GBM patient's head; FIG. 1B depicts the segmentation of the FIG. 1A MRI using a reference algorithm and; FIG. 1C depicts a validated segmentation that corresponds to the FIG. 1A MRI. The tumor was semi-automatically pre-segmented in both segmentations.

The embodiments described herein make it possible to predict the similarity between a segmentation generated by a given algorithm (e.g., the FIG. 1B segmentation) and an expected validated segmentation without ever generating that expected validated segmentation (i.e., a figure that, if generated, would correspond to FIG. 1C).

In one approach for accomplishing this goal, the inventors identified a set of features that are relevant to atlas-based segmentation and showed that these features are significantly correlated ($p<0.05$) with a similarity measure between validated and automatically computed segmentations. These features were incorporated in a decision tree regressor to predict the similarity of the validated and computed segmentations of 20 TTFields patients using a leave-one-out approach. The predicted similarity measures were highly correlated with the actual ones (average abs. difference 3% (SD=3%); r=0.92, $p<0.001$). It is therefore reasonable to conclude that quality estimation of segmentations is feasible by incorporating machine learning and segmentation-relevant features. Note that although only a single machine learning approach is described in this paragraph, a variety of alternative machine learning approaches may be substituted therefore, as will be appreciated by persons skilled in the relevant arts.

One example of a semi-automatic protocol for estimating the electric field within the tumor of a specific GBM patient for different TA layouts includes three steps: 1) head segmentation and the assignment of electrical tissue properties (conductivity and/or permittivity) to each voxel in the 3D image; 2) virtual placement of the TAs on the outer surface of the head, and; 3) simulation of the electric field propagation and estimation of the dose within the tumor. See, e.g., Bomzon, Z., et al.: Using computational phantoms to improve delivery of Tumor Treating Fields (TTFields) to patients: 2016 38th Annual International Conference of the IEEE Engineering in Medicine and Biology Society (EMBC). pp. 6461-6464. IEEE (2016), which is incorporated herein by reference. The head segmentation may be performed semi-automatically, for example by first using SPM-MARS and tweaking its parameters, and then by manually fixing the segmentation errors. See, e.g., Huang, Y., Parra, L. C.: Fully Automated Whole-Head Segmentation with Improved Smoothness and Continuity, with Theory Reviewed. PLoS One. 10, e0125477 (2015), which is incorporated herein by reference.

One approach that is suitable for performing the first step (head segmentation) is an atlas-based automatic head segmentation method. In one example, to ensure that estimates of TTFields dosage (e.g., in the tumor bed) remain similar and relevant to the outcomes, the inventors developed a process for estimating the quality of the atlas-based segmentation method. This method was specifically designed for evaluating atlas-based segmentation algorithms, aiming to facilitate a better estimation. Optionally, more general methods can also be incorporated for this purpose. See, e.g., Gerig, G., et al.: Valmet: A New Validation Tool for Assessing and Improving 3D Object Segmentation. Presented at the Oct. 14 (2001); Warfield, S. K., et al.: Simultaneous truth and performance level estimation (STAPLE): an algorithm for the validation of image segmentation. IEEE Trans. Med. Imaging. 23, 903-21 (2004); and Commowick, O., et al.: Estimating a reference standard segmentation with spatially varying performance parameters: local MAP STAPLE. IEEE Trans. Med. Imaging. 31, 1593-606 (2012), each of which is incorporated herein by reference.

The method for estimating the quality of a given segmentation relies on predicting a similarity measure between computed segmentations and validated segmentations of the head, but in the absence of the validated segmentation. To measure the quality of the segmentation, the Dice coefficient was measured between the computed- and validated-head segmentations of a training set. Then, four categories of features that seem to be relevant for atlas based segmentation methods were investigated: 1) quality of global (affine) registration; 2) quality of local (deformable) registration; 3) input image properties, and; 4) geometrical properties of the segmented tissues.

In one example, global registration quality is estimated with inverse consistency. See, e.g., Rivest-Henault, et al.: Robust inverse-consistent affine CT-MR registration in MRI-assisted and MRI-alone prostate radiation therapy. Med. Image Anal. 23, 56-69 (2015), which is incorporated herein by reference. In this example, the following features are extracted to account for the deformable registration quality: 1) deformation's field bias (mean of all vectors); 2) directional variability (SD of the 3-element vector that is the mean of each axis), and; 3) mean per-axis variability (the mean of 3-element vector that is the SD of each axis). In this example, the shortest axis length and the signal to noise ratio of each tissue separately are used as indicators of input image quality. And although many features that describe the segmentation shape can be defined, two measures were selected in this example: the volume of the shape and the number of connected components. These measures were computed per tissue as depicted in FIG. 2A.

The features were incorporated in a decision tree regressor. See, e.g., Breiman, L.: Classification And Regression Trees. Routledge (2017), which is incorporated herein by reference. A leave-one-out approach was applied on 20 TTFields patients' head MR-T1 images, their validated segmentations, and their automatically generated counterparts. Finally, a comparison of the measured Dice coefficients between the sets to the Dice coefficients' predictions was made.

Figure 2A:
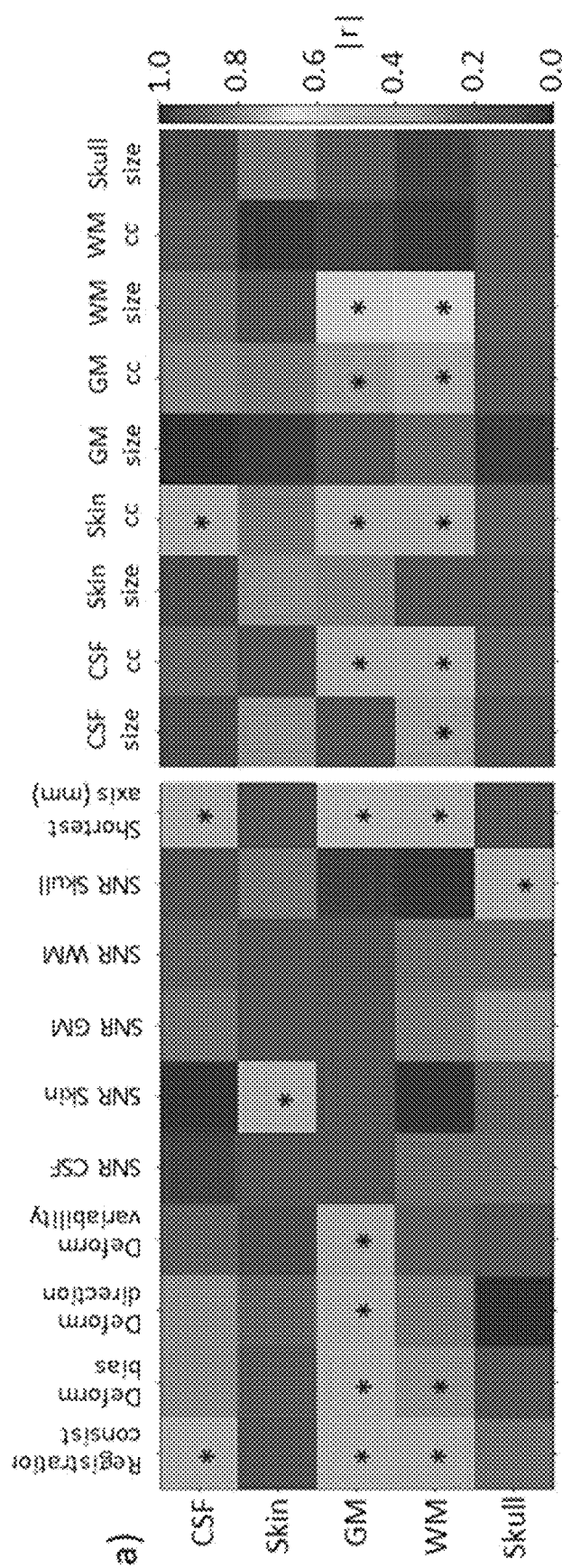
FIG. 2A depicts Absolute Pearson's correlation between computed features and the Dice coefficients of each segmented tissue.

FIG. 2A depicts Absolute Pearson's correlation between computed features (columns) and the Dice coefficients of each segmented tissue (rows). The Dice coefficients were computed between the validated head segmentations and those that were computed with a new automatic segmentation method (* $p<0.05$).

Figure 2B:
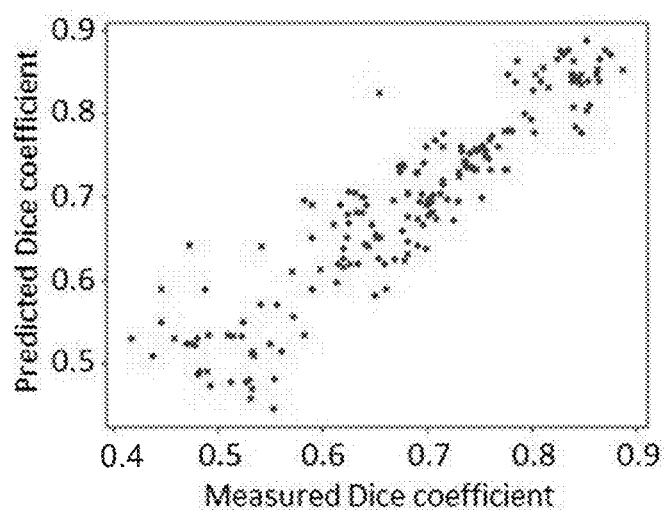
FIG. 2B depicts the suggested features and a decision tree regressor output predictions of Dice coefficients.

FIG. 2B depicts the suggested features and a decision tree regressor output predictions of Dice coefficients that are in a high correlation with the actual ones (r=0.92; $p<0.001$). Note that in FIGS. 2A-2B, CSF—cerebrospinal fluid; Skin—skin and muscle; GM—grey matter; WM—white matter; SNR—signal to noise ratio; cc—# connected components. The results depicted in FIGS. 2A-2B show that intra-cranial tissues were significantly ($p<0.05$) correlated with the registration (global and local) quality features and the shortest axis length; and in contrast, extra-cranial structures were significantly ($p<0.05$) correlated with image quality and tissue's shape properties. Moreover, the predicted measures were similar and highly correlated with the actual ones (average absolute difference 3% (SD=3%); r=0.92, $p<0.001$).

The results described herein show that a segmentation's quality estimation is feasible by incorporating a machine learning approach and features that are relevant to the segmentation. Optionally, the simultaneous truth and performance level estimation (STAPLE) method or one of its variants may be incorporated to improve the prediction of segmentation quality. See, e.g., Akhondi-Asl, et al.: Simultaneous truth and performance level estimation through fusion of probabilistic segmentations. IEEE Trans. Med. Imaging. 32, 1840-52 (2013), which is incorporated herein by reference, as well as the Warfield and Commowick references identified above. The segmentation quality estimation can improve the TTFields planning, and quantifying the effects of segmentation errors on the TTFields simulation results is described below.

Optionally, the system can be programmed to make an automatic adjustment to the segmentation, in order to arrive at an improved segmentation. For example, the system could change one or more parameters that have a global effect on the borders between certain tissue types. One example of such a change is to make an adjustment that, for all voxels in the image that correspond to tissue, (a) increases a calculated probability that a given voxel belongs to a first tissue type and (b) decreases a calculated probability that a given voxel belongs to a second tissue type.

After the automatic adjustment is made, the quality of the segmentation is reevaluated by presenting the adjusted segmentation to the machine learning system. The machine learning system outputs at least one second quality score for the adjusted segmentation. An indication is output when the at least one second quality score indicates an improved quality with respect to the at least one first quality score. This approach can be used to improve the segmentation by making automatic adjustments to the segmentation.

One common prior art approach for planning TTFields therapy involves the following four steps: create segmentation; user's visual evaluation of segmentation quality; segmentation correction using standard tools; and user's clinical decision making based on TTFields estimation.

Figure 3:
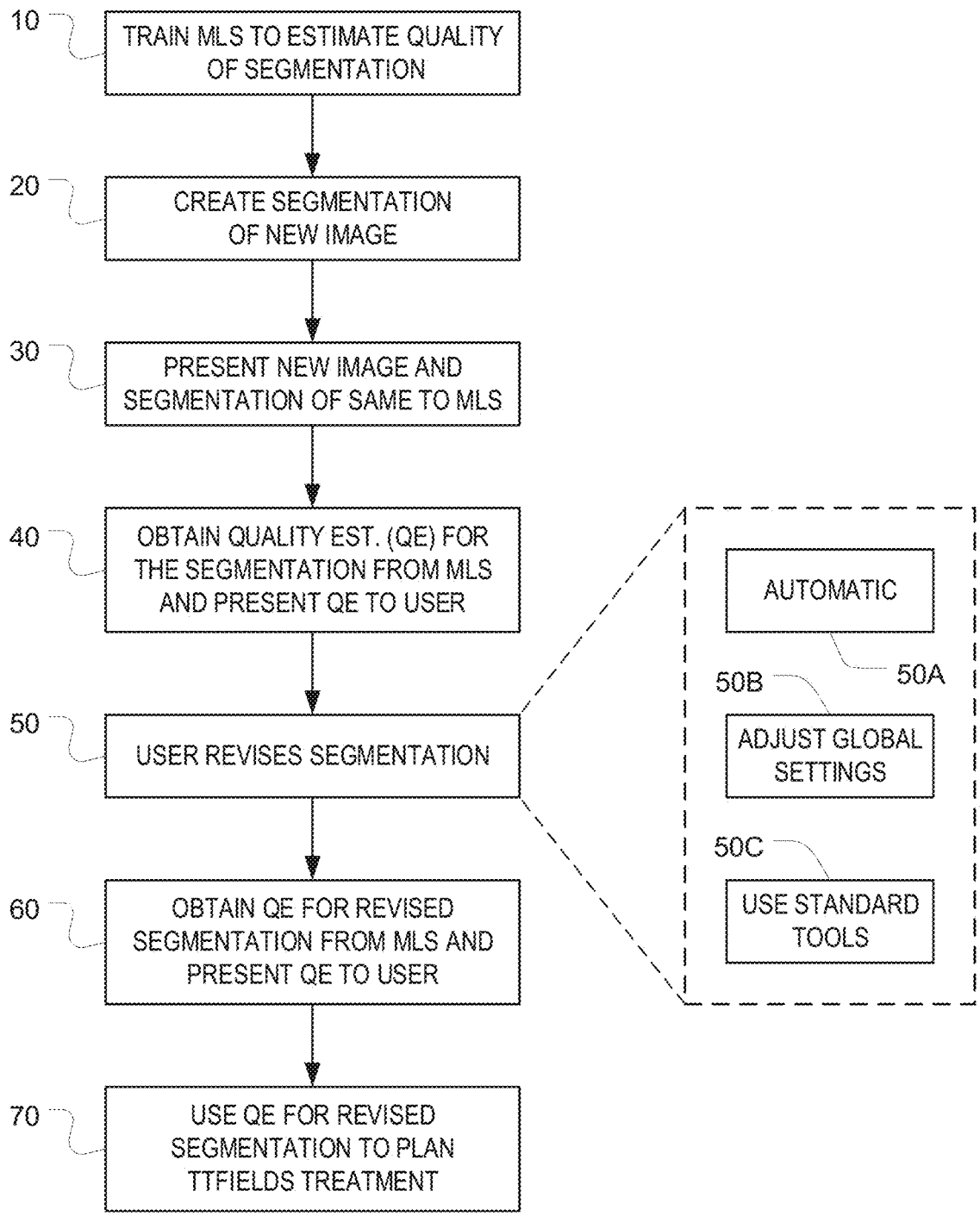
FIG. 3 is a flowchart depicting a set of steps for using the quality-estimation machine learning system to improve planning of the positioning of transducer arrays for TTFields therapy.

FIG. 3 is a flowchart depicting a set of steps for using the quality-estimation machine learning system to improve planning of the positioning of transducer arrays for TTFields therapy. Step 10 is training a machine learning system to estimate quality of a segmentation, and this can be done based on a plurality of reference images and at least one quality score that has been assigned to each of the reference images, as described above in connection with FIGS. 1 and 2.

If we assume that the machine learning system has previously been trained in step 10, the first step of the process for any new image will be step 20. Steps 20-70 in FIG. 3 depict an example of a TTFields planning protocol that improves upon the prior art approach by incorporating an automatic segmentation quality estimation (e.g., the one described above in connection with FIGS. 1-2) and guidance regarding segmentation errors and TTFields computation quality. In step 20, the user creates a segmentation of the medical image (e.g., using computational methods or manually). Any of a wide variety of conventional approaches that will be apparent to persons skilled in the relevant art may be used for creating the initial segmentation. In step 30, this segmentation as well as the associated original image are presented to the machine learning system.

Next, in step 40, a quality estimate for the presented segmentation is obtained from the machine learning system (e.g., as described above in connection with FIG. 1-2) and this quality estimate is presented to the user.

Figure 4:
FIG. 4 depicts an example of a suitable user interface that may be used to make the quality presentation to the user, and also to allow the user to make corrections to the segmentation.

FIG. 4 depicts an example of a suitable user interface that may be used to make the quality presentation to the user, and also to allow the user to make corrections to the segmentation. The quality presentation may be made in a variety of ways, including but not limited to (a) a single overall score number for any given segmentation (e.g., the 60% score depicted on the lower left of FIG. 4), (b) a recommendation that specific tissues should be revised due to a low quality score in any given segmentation (e.g., as depicted on the upper left of FIG. 4), and/or (c) an identification of particular regions on the image where the calculated quality of the segmentation is low for any given segmentation. One way to indicate the latter is by overlaying zones that are associated with low segmentation quality with a transparency (e.g., the circle 42 depicted in FIG. 4) or a region of opacity (e.g., the region 44 in FIG. 4).

A wide variety of alternative approaches for depicting zones that are associated with low segmentation quality will be readily apparent to persons skilled in the relevant arts, including but not limited to generating a color coded overlay (similar to a heat map) that depicts the estimated quality of the segmentation at each point in the image. In alternative embodiments, only a subset of the approaches depicted in FIG. 4 are provided to the user. In alternative embodiments, a different user interface is provided to the user to make the quality presentation.

In the next step (i.e., step 50) of the FIG. 3 protocol, the user revises the segmentation based on the quality data that was presented in step 40. This may be accomplished using a variety of approaches. In one approach (step 50A), the user executes an automatic correction method. In another approach (step 50B) the user changes parameters that have a global effect on the borders. This may be accomplished, for example, by making an adjustment that, for all voxels in the new image that correspond to tissue, (a) increases a calculated probability that a given voxel belongs to a first tissue type and (b) decreases a calculated probability that a given voxel belongs to a second tissue type. This adjustment may be made for any given segmentation using any appropriate user interface, including but not limited to the sliders depicted on the bottom of FIG. 4. For example, sliding the first slider 46 labeled "Skull to Muscles" to the left progressively increases the calculated probability that any given voxel is a skull voxel and progressively decreases the calculated probability that the given voxel is a muscle voxel. And sliding the first slider 46 to the right progressively increases the calculated probability that any given voxel is a muscle voxel and progressively decreases the calculated probability that the given voxel is a skull voxel. In yet another approach (step 50C), the user uses standard segmentation tools such as brush or polygon marking for correction of local errors. Note that the three approaches identified above are merely examples of how to revise the segmentation, and a variety of alternative approaches that will be apparent to persons skilled in the relevant arts may also be used.

In some preferred embodiments, after revisions to the segmentation have been made in step 50, the system recalculates the quality of segmentation in step 60 (e.g. using the approaches described above in connection with FIGS. 1 and 2) and presents the revised results to the user. This may be done in real time in response to adjustments that are made by the user in step 50. Alternatively, this may be done upon user request (e.g., by including a "refresh quality estimate" button on the user interface.

The next step (i.e., step 70) of the FIG. 3 protocol occurs after corrections to the segmentation have been made. In this step, the estimated quality for the segmentation that has been selected by the user is used to plan TTFields treatment, taking into account the quality estimate for the selected segmentation. The quality of the TTFields simulation is directly related to the quality of tissue segmentation, because assigning the wrong tissue can result in inaccurate estimation of the field and suboptimal TTFields treatment recommendation. The relation between segmentation and TTFields errors can be modeled such that an estimate of the segmentation quality will facilitate an estimate for the computed TTFields quality. TTFields quality estimates may be utilized to assist the caregiver in the treatment decision making. For example, assume that there are two recommended transducer array layouts with similar TTFields dose, but the TTFields quality is much better for one layout than the other. The embodiments described herein provide this information to the user so that they can make a better-informed clinical decision (e.g., by selecting the layout with the higher quality).

Taking the previous idea one step further, the error in segmentation can be propagated to effect the recommended treatment automatically. That is, the software will prefer setups in which the confidence regarding the TTFields dose is high in addition to other factors.

Figure 5A:
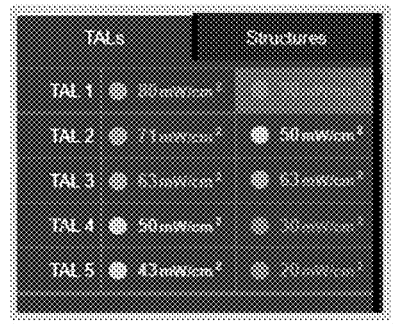
FIGS. 5A-5C depict an example of a user interface that may be used to summarize the estimated field strength (or power density) in a tumor bed for five different candidate transducer array layouts.
Figure 5B:
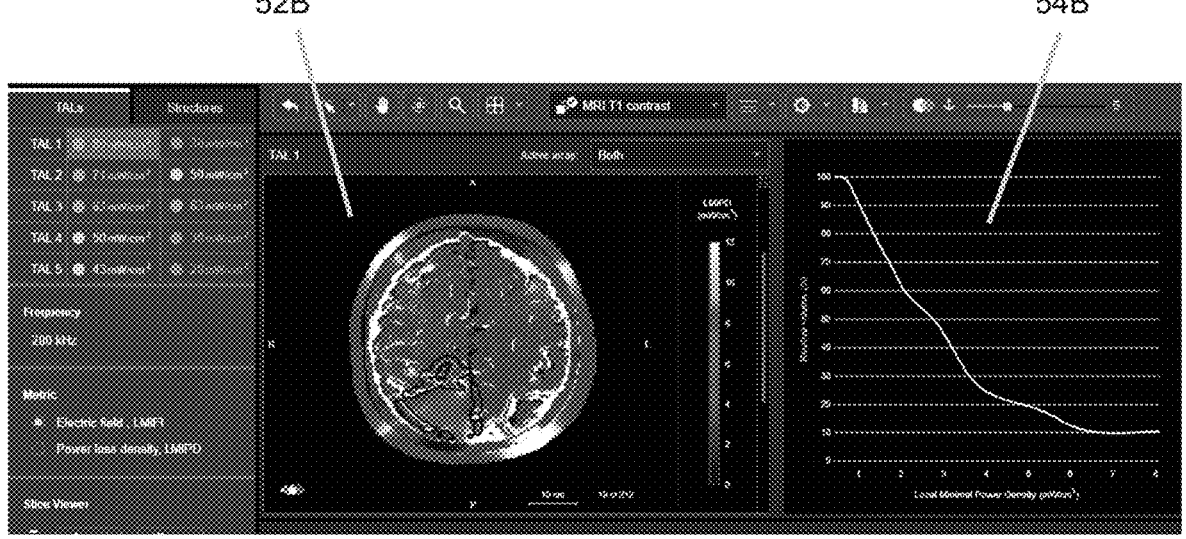
Figure 5C:
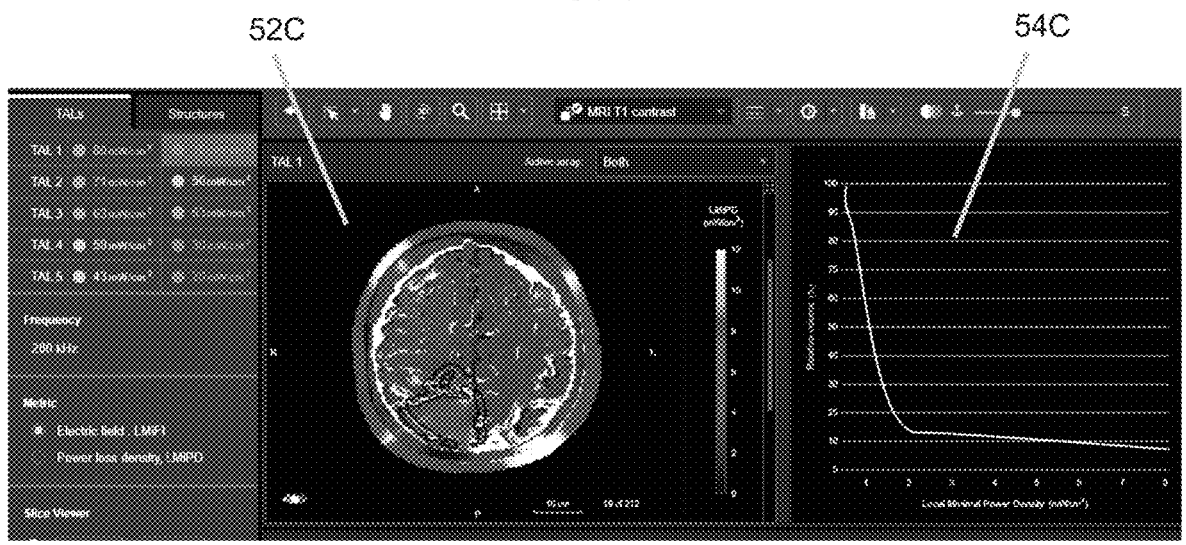

FIGS. 5A-5C depicts an example of a suitable user interface that may be used to summarize the estimated field strength (or power density) in the tumor bed for five different candidate transducer array layouts (TAL 1-TAL 5), and also show how the quality of the segmentation might impact the field-strength estimates. The operator can use this information as a basis for selecting a given candidate transducer array layout over the other candidates.

For each candidate transducer array layout based on a given segmentation, the system calculates how a determined quality of the given segmentation can lower an average expected field strength in a target region (e.g., the region that corresponds to a tumor) by running a finite element simulation using tissue types selected based on the given segmentation. In addition, for each candidate transducer array layout based on a given segmentation, the system calculates how a determined quality of the given segmentation can lower a minimum expected field strength in a target region by running a finite element simulation using tissue types selected based on the given segmentation.

More specifically, FIG. 5A shows a table that presents two values for each of the candidate transducer array layouts being considered (TAL 1-TAL 5). For each transducer array layout, the value on the left is the average estimated TTFields power density in the tumor when the quality of the segmentation is ignored; and the value on the right is the lowest (or $5^{th}$ percentile) average estimated TTFields power density in the tumor when the quality of the segmentation is considered.

In this example, the first candidate transducer array layout (TAL1) is associated with the highest average estimated TTFields power density in the tumor of 80 mW/cm². But when the impact of possible errors in the segmentation is considered, the TTFields power density for that same layout (TAL1) could be as low as 30 mW/cm². In contrast, the third candidate transducer array layout (TAL3) has a lower average estimated TTFields power density in the tumor when possible error in segmentation are ignored (63 mW/cm², see the left column for TAL3). But when the impact of possible errors in the segmentation is considered, the lowest reasonably expected (e.g., $5^{th}$ percentile) power density for the TAL3 layout will also be 63 mW/cm² (right column for TAL3). Because the quality of the segmentation will not have as big a negative impact on the field power density when the TAL3 layout is selected, and because the lowest reasonably expected power density for that layout (i.e. 63 mW/cm²) is significantly higher than the lowest reasonably expected power density for the TAL1 layout (30 mW/cm²), the TAL3 layout is preferable to the TAL1 layout, and should therefore be selected.

In other words, determining which TTFields simulation is the best can be accomplished by maximizing X, where X is the lowest reasonably expected power density in the tumor bed. Optionally, the system can be programmed to calculate which layout maximizes X, and to recommend that layout. Optionally, a confidence score may be associated with one or more possible layouts, where the confidence score is indicative of odds that a given layout is the best layout.

Optionally, the effect of the TTFields spatial distribution for each of the candidate transducer array layouts may be displayed to the user to help the user select which TAL is the best. In the illustrated example, clicking on the left column in FIG. 5A for TAL 1 will bring up FIG. 5B, which shows a spatial map of the estimated field power density overlaid on the MRI (in the middle panel 52B) and a graph of the local minimum power density (in the right panel 54B) when the quality of the segmentation is ignored. And clicking on the right column in FIG. 5A for TAL 1 will bring up FIG. 5C, which shows a spatial map of the lowest (or 5% percentile) average estimated TTFields power density overlaid on the MRI (in the middle panel 52C) and a graph of the local minimum power density (in the right panel 54C) when the quality of the segmentation is considered.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of determining a quality of a segmentation of an image of a head that includes a plurality of tissue types, the method comprising the steps of:
    measuring a Dice coefficient between a computed head segmentation and a validated head segmentation of a training set;
    estimating a registration quality between the computed head segmentation and the validated head segmentation;
    using a shortest axis length and a signal to noise ratio of each of the tissue types separately as an indicator of input image quality; and
    comparing the measured Dice coefficient to a plurality of predictions based on Dice coefficients'.

2. The method of claim 1, wherein the registration quality is estimated based on a deformation field bias, directional variability, and mean per-axis variability.

3. The method of claim 1, wherein a volume of a shape and a number of connected components are used to describe a segmentation shape.

4. The method of claim 1, further comprising outputting a result of comparing the measured Dice coefficients to the plurality of predictions based on Dice coefficients as a quality score of the computed head segmentation.

5. The method of claim 1, further comprising outputting a result of comparing the measured Dice coefficients between the sets to the plurality of predictions based on Dice coefficient as a quality score of the computed head segmentation for an entirety of the input image.

6. The method of claim 1, further comprising outputting a separate result of comparing the measured Dice coefficients between the sets to the plurality of predictions based on Dice coefficients a quality score of the computed head segmentation for each of a plurality of regions within the input image.

7. The method of claim 1, further comprising outputting a separate result of comparing the measured Dice coefficients between the sets to the plurality of predictions based on Dice coefficients as a quality score of the computed head segmentation for each of the tissue types.

8. The method of claim 1, wherein the plurality of predictions based on Dice coefficients are generated using features describing a segmentation shape.

9. The method of claim 1, wherein the plurality of predictions based on Dice coefficients' predictions are generated using features, each of which is computed for each of the tissue types, describing a segmentation shape.

10. The method of claim 1, wherein the plurality of predictions based on Dice coefficients' predictions are generated using a volume of a segmentation shape and a number of connected components to describe the segmentation shape.

11. The method of claim 1, wherein the plurality of predictions based on Dice coefficients' predictions are generated using a volume of a segmentation shape and a number of connected components, each of which is computed for each of the tissue types, to describe the segmentation shape.

12. The method of claim 1, wherein the plurality of predictions based on Dice coefficients' predictions are generated using a decision tree regressor.

13. The method of claim 1, wherein the measuring of the Dice coefficient comprises measuring a separate Dice coefficients for each of the tissue types.

14. The method of claim 1, wherein the plurality of predictions based on Dice coefficients' predictions are generated for each of the tissue types.

15. The method of claim 1, wherein the measuring of the Dice coefficient is performed between a computed head segmentation and a validated head segmentation of a plurality of training sets.

16. The method of claim 1, wherein a volume of a shape and a number of connected components, each of which is computed per tissue, are used to describe a segmentation shape.

* * * * *